United States Patent [19]
Bajema et al.

[11] Patent Number: 6,068,059
[45] Date of Patent: May 30, 2000

[54] GROUND-CROP HARVESTER CONTROL SYSTEM

[75] Inventors: Rick Bajema; Dennis Ruben Nitzel, Sr., both of Rhinelander, Wis.

[73] Assignee: Recot, Inc., Pleasanton, Calif.

[21] Appl. No.: 09/084,880

[22] Filed: May 28, 1998

[51] Int. Cl.[7] .................................................. A01D 13/00
[52] U.S. Cl. ....................... 171/130; 171/142; 56/14.5; 56/DIG. 15; 56/10.2 R
[58] Field of Search ..................... 171/126, 111, 171/130, 131, 134, 142, 1; 56/10.2 A, DIG. 15, 13.5, 14.5, 16.6, 10.2 R

[56] References Cited

U.S. PATENT DOCUMENTS

| | | | |
|---|---|---|---|
| 2,693,068 | 11/1954 | Rodin | 171/17 |
| 3,190,200 | 6/1965 | Arnold . | |
| 3,466,854 | 9/1969 | Ashton et al. . | |
| 3,470,681 | 10/1969 | Saemann . | |
| 3,515,144 | 6/1970 | Morrison . | |
| 3,690,383 | 9/1972 | Malley et al. | 171/126 |
| 3,889,796 | 6/1975 | Baily et al. . | |
| 4,130,980 | 12/1978 | Fardal et al. | 56/10.2 |
| 4,448,257 | 5/1984 | McRae . | |
| 4,458,471 | 7/1984 | Herwig . | |
| 4,487,002 | 12/1984 | Kruse et al. | 56/10.2 |
| 4,513,562 | 4/1985 | Strubbe | 56/10.2 |
| 4,548,027 | 10/1985 | Maeoka | 56/10.2 |
| 4,842,076 | 6/1989 | Welp . | |
| 4,875,889 | 10/1989 | Hagerer et al. . | |
| 4,893,241 | 1/1990 | Girodat et al. . | |
| 4,934,985 | 6/1990 | Strubbe . | |
| 4,967,544 | 11/1990 | Ziegler et al. . | |
| 5,025,614 | 6/1991 | Orsborn et al. . | |
| 5,077,963 | 1/1992 | Harrison et al. . | |
| 5,326,320 | 7/1994 | von Allwoerden . | |
| 5,327,708 | 7/1994 | Gerrish | 56/1 |
| 5,666,793 | 9/1997 | Bottinger | 56/10.2 R |
| 5,855,108 | 1/1999 | Salz et al. . | |

FOREIGN PATENT DOCUMENTS

| | | |
|---|---|---|
| 0914765 | 5/1999 | European Pat. Off. . |
| 8503841 | 9/1985 | WIPO . |

*Primary Examiner*—Victor Batson
*Attorney, Agent, or Firm*—Rothwell, Figg, Ernst & Kurz, p.c.

[57] ABSTRACT

A ground-crop harvester for potatoes and the like has two unique control features that enhance the productivity of the device and the quality of the harvested ground-crop (e.g., less bruising). The harvester preferably includes an excavator arranged to scrape up a layer of soil and ground-crop and a primary conveyor configured to receive the soil and ground-crop scraped up by the excavator and to separate soil from the ground-crop. A downstream conveyor is arranged downstream of the primary conveyor (e.g., directly downstream therefrom or after a secondary conveyor and/or other conveyors) to receive the separated ground-crop. A primary conveyor adjustable speed drive mechanism is provided for the primary conveyor. A downstream conveyor adjustable speed drive mechanism is provided for the downstream conveyor. A speed measurer or sensor is provided for sensing the forward speed of the harvester and for emitting signals representative of the speed. An amount sensor (e.g., a height sensor) is provided for sensing an amount of product conveyed by the downstream conveyor and for emitting signals representative of the amount. And, a controller is provided that controls the primary conveyor adjustable speed drive mechanism to vary the speed of the primary conveyor.

25 Claims, 6 Drawing Sheets

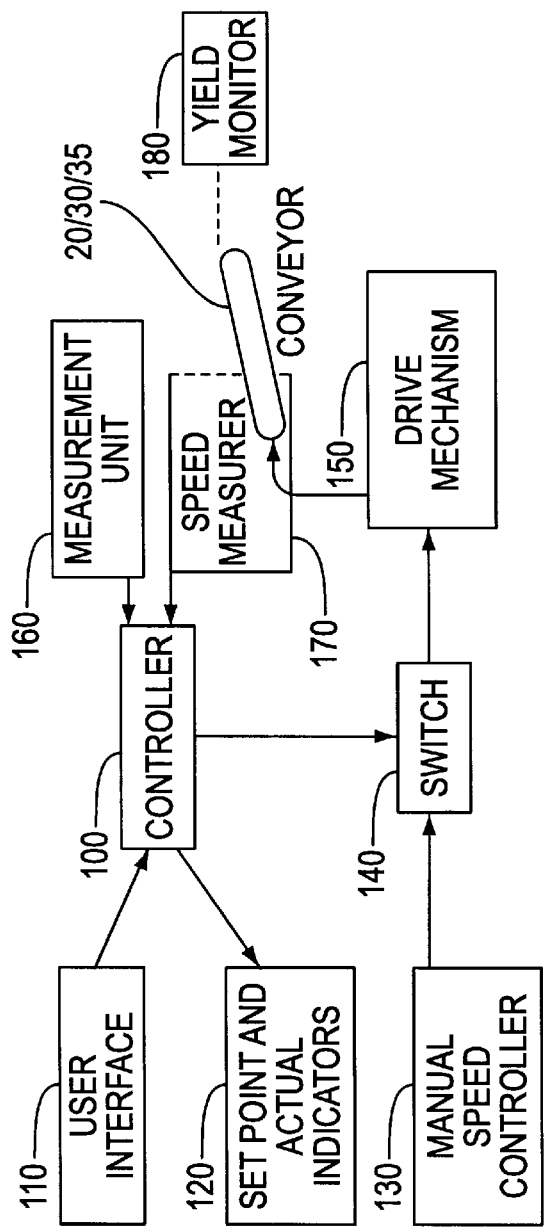
FIG. 2
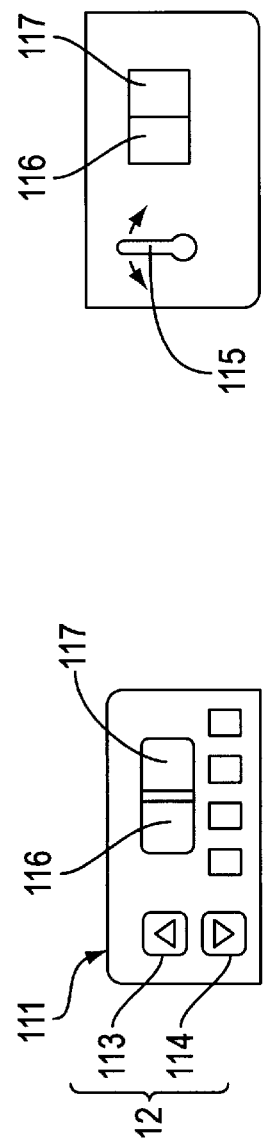
FIG. 3(A)
FIG. 3(B)

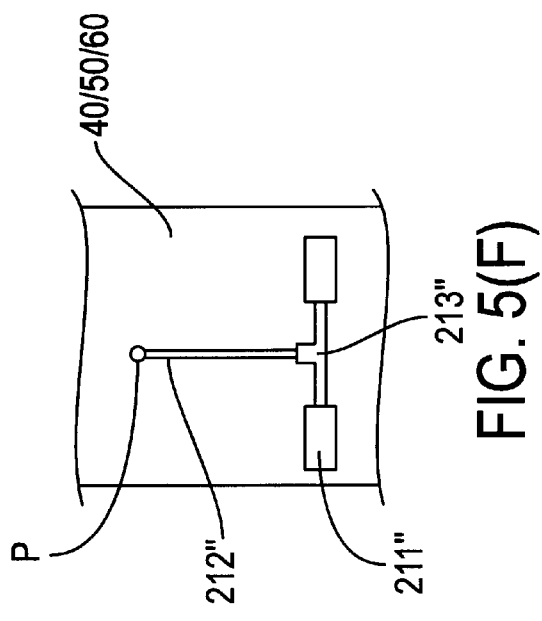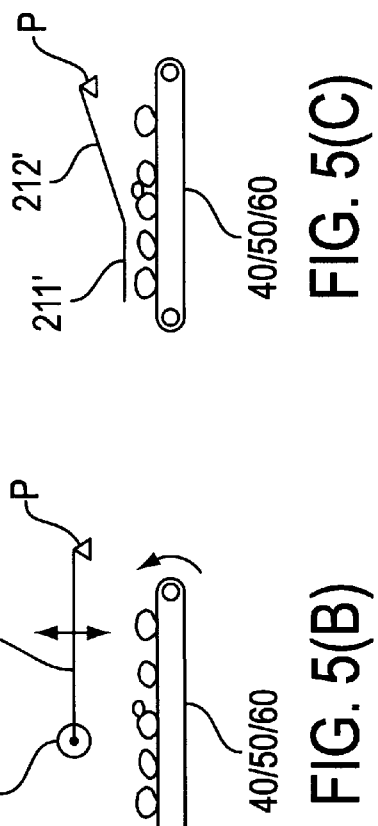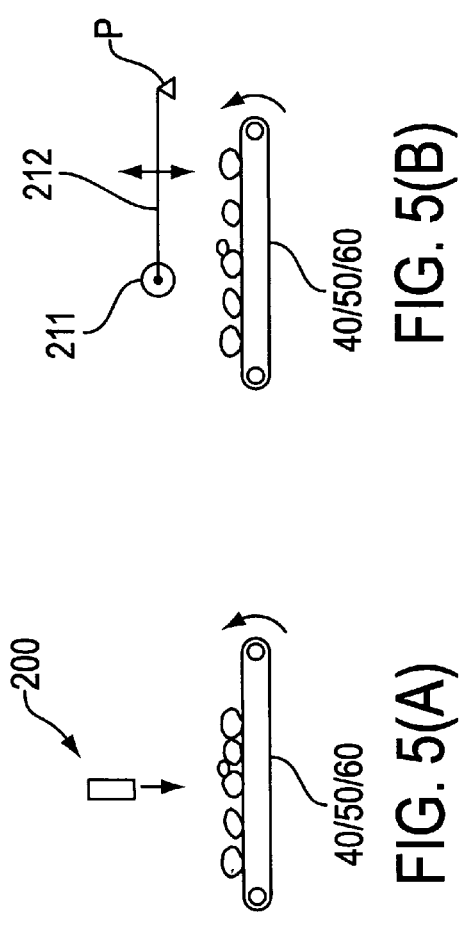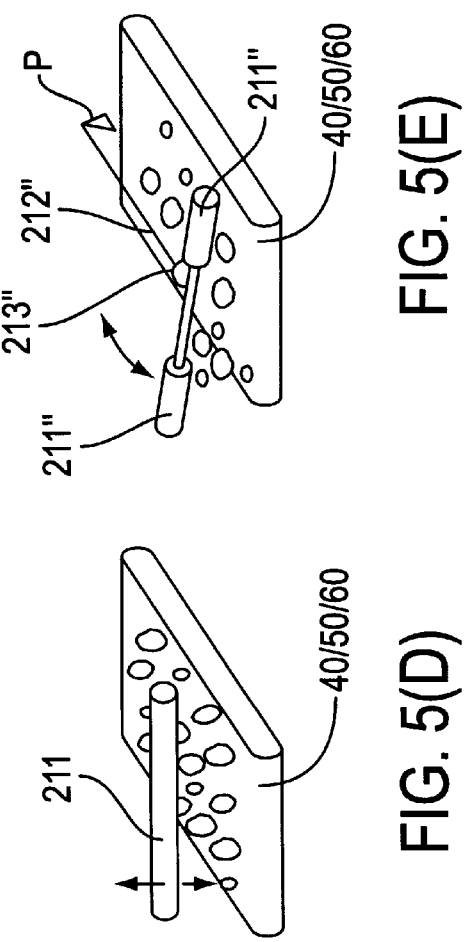

GROUND-CROP HARVESTER CONTROL SYSTEM

BACKGROUND OF THE INVENTION

1. Field of the Invention

The present invention pertains generally to ground-crop harvesters and more particularly to harvesters that dig ground-crops from under the soil, separate soil from the ground-crops, and convey the ground-crops upon the harvester. The present invention can be used to improve equipment for gathering potatoes, sweet potatoes, yams, carrots, beets, cucumbers, onions, pumpkins, squash, flower bulbs, onions, pumpkins, squash, peanuts, and other ground-crops and/or any other ground-crops, but is most particularly advantageous for use with gathering ground-crops such as potatoes and the like.

2. Description of the Related Art

The present invention is an improvement over existing ground-crop harvesters, and notably over existing potato harvesters. As shown in FIG. 1, potato harvesters typically have a front blade 10 or other means that excavates a layer of soil S and potatoes T, which is directed onto and are conveyed along a primary conveyor 20. The proportion of soil on the primary conveyor can initially be relatively high (e.g., possibly about 95% soil by volume or more), but could also be minimal. As the potatoes and soil are conveyed, the soil breaks away from the potatoes and falls through the conveyor surface (e.g., between cross-bars). The potatoes and the remaining soil are then conveyed to a secondary conveyor 30. The soil continues to separate from the potatoes along the secondary conveyor 30. The generally soil-free product is then conveyed to a rear-cross conveyor 40 that conveys the product laterally onto a side elevating conveyor 50 that in turn conveys the product to a transverse boom conveyor 60. The transverse boom conveyor 60 is typically a movable conveyor that can be raised and/or lowered to direct the potatoes laterally to a truck bed or to another location.

In such harvesters, the extent of damage and bruising of the potatoes is directly related to the quantity of the product (e.g., potatoes and soil) upon the conveyors. When less than an optimal amount of product is present on a conveyor, increased bruising occurs.

The majority of harvesters have fixed conveyor speeds. As a result, the concentration of the load upon the primary and secondary conveyors varies with the ground speed of the harvester. The conveyor thus receives a larger quantity when the ground speed of the harvester is increased and a smaller quantity when the ground speed is reduced (i.e., when the harvester moves faster, a greater amount soil and ground-crop is loaded upon the primary conveyor). The quantity loaded upon the primary conveyor is thus inconsistent, leading inevitably to bruising and low productivity. For example, when the moisture content of the soil is high, such as after a rainfall, the soil becomes stickier, i.e., more adhesive, and separation from the ground-crop can be difficult (soil separation is facilitated in dry conditions). In order to separate the wet soil when the primary conveyor speed is fixed, the operator may slow down the ground speed of the harvester (i.e., reducing the amount received per unit time). As a result, however, the harvester can become severely under-loaded, especially at conveyors downstream of the primary and secondary conveyors. This greatly increases the risk of bruising. This under-loading occurs because (a) the primary and secondary conveyors continue at the same rate despite the slowing down of the harvester and (b) the conveyors downstream of the primary and secondary conveyors continue at a predetermined rate despite a reduction in volume thereon. Thus, the harvester does not consistently load an optimal amount of soil and ground-crop onto the primary conveyor, which also reduces the digging capacity of the harvester due to the slower forward speed to accommodate separation on the primary and secondary conveyor. In addition, this manner of varying ground speed is impractical, imprecise and highly inconsistent. For the same reason, the large variations in soil texture (ease of separation changes with soil texture and moisture) that typically occur within fields make it extremely difficult to operate existing harvesters optimally within fields at all times.

Several known potato harvesters include hydraulic drives that enable several conveyors on the machine to be adjusted independently. That is, an operator can observe soil conditions and shift to an alternate (but constant) conveyor speed periodically. The primary conveyor is set at a faster (constant) speed when the moisture level of the soil is increased in order to further spread out the product on the conveyor so that the soil more readily falls through the conveyor. However, there are too many factors for an operator to manage (e.g., ground speed, product yield, and changing soil conditions) so that the conveyors are typically left running for the worst case scenarios—resulting in excessive bruising, low productivity and other drawbacks.

Thus, existing harvesters do not consistently load an optimal amount of soil and ground-crop onto a primary conveyor and onto a secondary conveyor, which (a) increases the potential for damage to product loaded onto the primary and secondary conveyors and (b) reduces the digging capacity of the harvester. And, existing harvesters do not maintain a consistent optimal load amount on conveyors downstream of the primary and secondary conveyors, which increases the potential for damaging product loaded on such downstream conveyors.

SUMMARY OF THE INVENTION

In contrast to existing ground-crop harvesters, the ground-crop harvesters of the preferred embodiments of the present invention can consistently load an optimal amount of soil and ground-crop onto initial "separating conveyors" (e.g., a "primary conveyor" and/or a "secondary conveyor"), substantially reducing product bruising and damage and increasing the digging capacity of the harvesters. The harvesters of the preferred embodiments of the present invention can also maintain a consistent optimal load amount on conveyors downstream of the primary and secondary conveyors, substantially reducing product damage on such downstream conveyors.

In this regard, the present invention provides two unique control features for ground-crop harvesters. These control features can be utilized independently of one another, but are most beneficial when used together. In this manner, the handling of product on the entire harvester can be optimized. The first control feature involves a unique system for controlling the separating conveyors of a harvester (e.g., primary, secondary and/or de-viner conveyors), and the second control feature involves a unique system for controlling conveyors downstream of the separating conveyors.

According to a first aspect of the invention, a ground-crop harvester is provided that includes: a) an excavating means arranged to scrape up a layer of soil and ground-crop; b) a primary conveyor configured to receive the soil and ground-crop scraped up by the excavating means; c) an adjustable speed drive mechanism (preferably a continuously adjustable variable speed drive mechanism) that drives the primary conveyor; d) a harvester drive that drives the harvester; and e) a controller that automatically controls the drive mechanism to vary a speed of the primary conveyor so as to maintain a consistent load on the primary conveyor irrespective of variations in the forward speed of the harvester.

According to another aspect of the invention, a ground-crop harvester is provided that includes: a) an excavating means arranged to scrape up a layer of soil and ground-crop; b) a primary conveyor configured to receive the soil and ground-crop scraped up by the excavating means; c) an adjustable speed drive mechanism that drives the primary conveyor; d) a harvester drive that drives the harvester; e) means for sensing the forward speed of the harvester and for emitting signals representative of the speed; f) a controller that controls the drive mechanism that drives the primary conveyor based on the signals from the means for sensing the forward speed.

According to another aspect of the invention, the ground-crop harvester further includes a secondary conveyor downstream of the primary conveyor and an adjustable speed drive mechanism for the secondary conveyor, the controller also automatically controlling the drive mechanism for the secondary conveyor to vary a speed of the secondary conveyor so as to maintain a consistent load on the secondary conveyor irrespective of variations in the forward speed of the harvester.

According to another aspect of the invention, a large debris conveyor is also provided that receives large debris from the primary conveyor and removes said large debris from the harvester, wherein the controller controls the large debris conveyor to vary in accordance with the speed of the secondary conveyor. The large debris conveyor is preferably a de-viner conveyor that surrounds said secondary conveyor.

According to another aspect of the invention, the controller controls the adjustable speed drive mechanism to maintain a speed that is a predetermined ratio of a forward speed detected by the means for sensing forward speed of the harvester.

According to another aspect of the invention, a means is provided for sensing the actual speed of the primary conveyor and for sending signals representative thereof to the controller.

According to another aspect of the invention, the controller includes a feedback loop to re-adjust conveyor speed signals sent to the adjustable speed drive mechanism based on the signals received from the means for sensing the actual speed of the primary conveyor.

According to another aspect of the invention, at least one indicator is provided for indicating the actual speed of the primary conveyor and a desired speed of the primary conveyor.

According to another aspect of the invention, a ground-crop harvester is provided having: a) an excavating means arranged to scrape up a layer of soil and ground-crop; b) a primary conveyor configured to receive the soil and ground-crop scraped up by the excavating means and to separate soil from the ground-crop; c) a downstream conveyor configured to receive the separated ground-crop from the primary conveyor; d) an adjustable speed drive mechanism that drives the primary conveyor; e) means for sensing an amount of product conveyed by the downstream conveyor and for emitting signals representative of the amount; f) an adjustable speed drive mechanism that drives the downstream conveyor; g) control means for adjusting the speed of the downstream conveyor via the adjustable speed drive mechanism for the downstream conveyor based on the signals from the means for sensing an amount of product conveyed by the downstream conveyor.

According to another aspect of the invention, the means for sensing an amount of product conveyed by the downstream conveyor includes a means for sensing the height of the product received on the downstream conveyor.

The terminology "excavating means" is used herein to identify any known excavating means for digging or scraping a layer of soil, such as used in known harvesters. The excavating means may dig deep into the soil or may scape a minimal layer of soil. In the most preferred embodiments, however, the excavating means digs a sufficient depth to remove potatoes and the like from the soil. Exemplary excavating means include: 1) one or more flat blades as shown in the illustrated embodiments; 2) one or more rotating blades; 3) one or more discs as shown in U.S. Pat. No. 4,448,257, the disclosure of which is incorporated herein by reference; 4) the front end of the primary conveyor itself (i.e., by stabbing the front end of the primary conveyor directly into the soil); 5) a separate digging apparatus that precedes the harvester, such as in a common indirect harvester, and/or 6) any other appropriate excavating means known in the art.

The terminology "ground-crop" is used herein to identify any produce that is located on or at least partly under the ground surface and/or that is gathered by digging below the ground surface—examples of which can include, e.g., potatoes, sweet potatoes, yams, carrots, beets, onions, flower bulbs, zucchini, squash, cucumbers, pumpkins, peanuts, other ground-crops, and any other ground-crops. In addition to ground-crops, the present invention can also be used for collecting other ground-items such as, for example, rocks, minerals or other natural or synthetic objects. Nevertheless, the present invention is most preferably utilized for harvesting ground-crops such as potatoes and the like.

The present invention can greatly improve existing harvesters by, among other things, more gently gathering and handling product, such as potatoes and the like, and by more consistently separating soil gathered with the product. The above and other advantages, features and aspects of the present invention will be more readily perceived from the following description of the preferred embodiments taken together with the accompanying drawings and claims.

BRIEF DESCRIPTION OF THE DRAWINGS

The present invention is illustrated by way of example and not limitation in the accompanying drawings, in which like references indicate like parts, and in which:

FIG. 2 is a diagram of a system according to one embodiment of a first control feature of the invention;

FIG. 3(A) is a front view of a control panel according to one embodiment of the invention;

FIG. 3(B) is a front view of a control panel according to another embodiment of the invention;

FIG. 5(A) is a schematic side view of a first embodiment of a height sensor used in the second control aspect of the invention;

FIG. 5(B) is a schematic side view of a second embodiment of a height sensor used in the second control aspect of the invention;

FIG. 5(C) is a schematic side view of a third embodiment of a height sensor used in the second control aspect of the invention;

FIG. 5(D) is a schematic perspective view of one example of the embodiment shown in FIG. 5(A);

FIG. 5(E) is a schematic perspective view of a fourth embodiment of a height sensor used in the second control aspect of the invention;

FIG. 5(F) is a schematic top view of the embodiment shown in FIG. 5(E);

DETAILED DESCRIPTION OF THE PREFERRED EMBODIMENTS

Figure 1A:
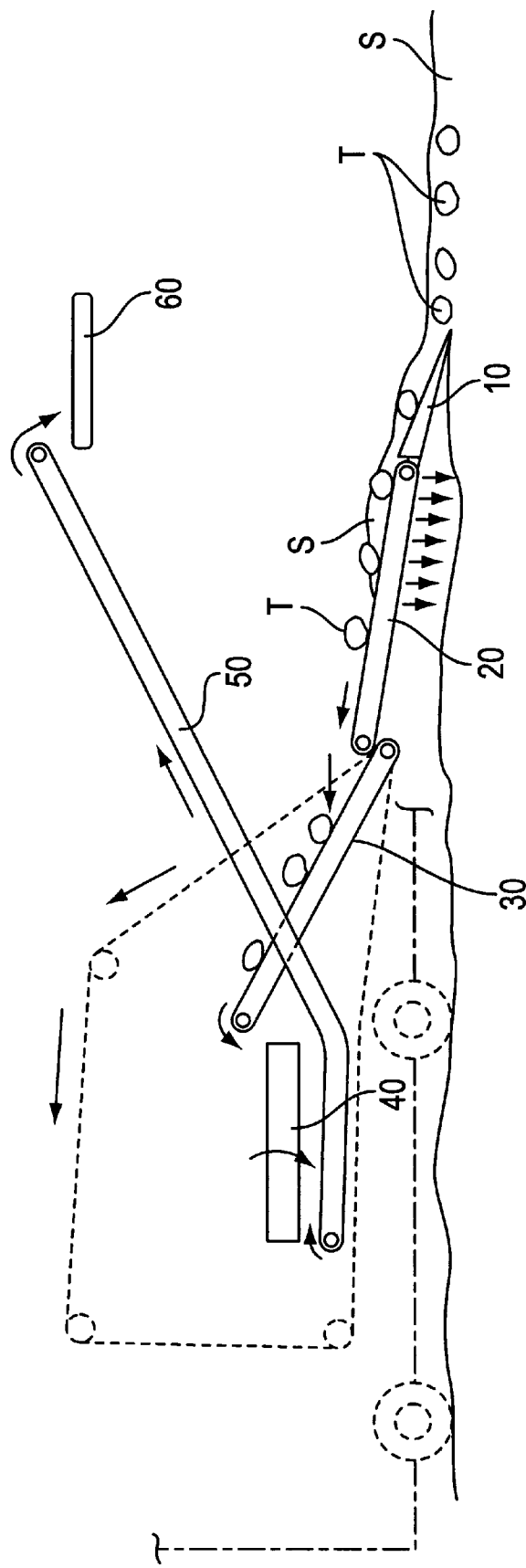
FIG. 1(A) is a schematic side view of one example of a ground-crop harvester into which the present invention is incorporated.
Figure 1B:
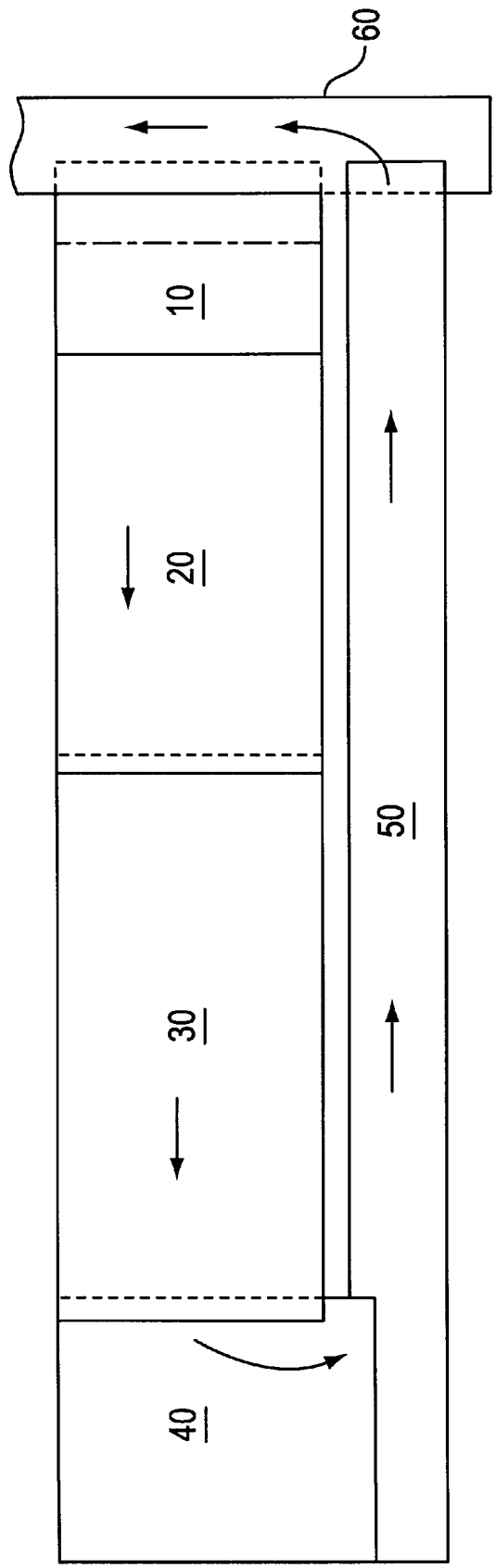
FIG. 1(B) is a schematic top view of the harvester shown in FIG. 1(A)

As indicated above, the preferred embodiments of the present invention include two separate control features for ground-crop harvesters. These control features are beneficial independent of one another, but are most beneficial when combined together in a ground-crop harvester. The first control feature involves a unique system for controlling one or more of the "separating conveyors" of a harvester (e.g., such as a "primary conveyor," a "secondary conveyor", and/or a "de-viner conveyor" discussed herein with reference to one preferred embodiment), and the second control feature involves a unique system for controlling "conveyors downstream" of the separating conveyors (e.g., such as a "rear-cross conveyor", an "elevational conveyor" and/or a "boom conveyor" discussed herein with reference to one preferred embodiment).

Separating Conveyor Control

The first control feature is a novel system for maintaining a constant ratio of the speeds of one or more of the "separating conveyors" of the harvester with respect to the forward speed of the harvester—regardless of forward speed variations of the harvester.

Although the present invention is applicable to virtually any ground-crop harvester, it is important that the ground-crop harvester includes at least one separating conveyor. The separating conveyors can include, for example, primary and secondary conveyors that separate soil from the ground-crop. The number of soil separating conveyors, however, can vary depending on circumstances. In addition, the separating conveyors can also include a large debris conveyor, e.g., de-viner conveyor 35, that separates vines and the like debris from the ground-crop (e.g., the ground-crop passes through openings in the de-viner conveyor in a known manner, while vines and the like are conveyed away by the de-viner conveyor). As one example, the de-viner conveyor can be a bar-type conveyor belt similar to the belt 13 shown in U.S. Pat. No. 4,842,076, the entire disclosure of which is incorporated herein by reference. A de-viner conveyor 35 is preferably included, but it may be omitted if desired.

In operation, when the harvester's forward speed is reduced, the speeds of the primary, secondary and/or de-viner conveyors are automatically reduced, and when the harvester's forward speed is increased, the speeds of the primary, secondary and/or de-viner conveyors are automatically increased. In this manner, an optimal loading of the conveyors can be maintained, which minimizes bruising, increases productivity, and minimizes the amount of soil carried beyond the soil separating conveyors (e.g., the primary and secondary conveyors) and into the harvester.

In the preferred embodiment, the system includes a means for sensing the actual forward speed of the harvester and a controller for setting the speed of the primary, secondary and/or de-viner conveyors based on this actual forward speed. (As discussed below, the particular means used to measure the forward speed of the ground-crop harvester can be critical to the optimal performance of the device.) The user preferably selects desired ratios of the primary conveyor speed to the forward speed and/or the secondary conveyor speed to the forward speed, and the controller automatically adjusts the speed of the primary and/or secondary conveyors in accordance with the following equation (s).

Detected Forward Speed×Selected Ratio #1=Primary Conveyor Speed (Set Point)     EQ. 1(A)

Detected Forward Speed×Selected Ratio #2=Secondary Conveyor Speed (Set Point)     EQ. 1(B)

In addition, when a de-viner conveyor is included, which is preferred, the de-viner conveyor is preferably controlled via the controller 100 to vary along with a secondary conveyor. The de-viner conveyor 35 preferably travels at the same speed as the secondary conveyor, but it can also travel at a faster or slower rate depending on circumstances.

FIG. 2 is a diagram illustrating a preferred embodiment of the system for controlling separating conveyors of a harvester. In the illustrated embodiment, the system is utilized for controlling a primary conveyor 20, a secondary conveyor 30 and a de-viner conveyor 35. In this regard, a central controller 100 is used to control the speed of primary, secondary and de-viner conveyors 20, 30 and 35 (see numeral 20/30/35), which are driven via a drive mechanism 150. A user interface 110 is provided for selectively inputting desired ratios of the conveyor speeds to the forward speed. The selected ratios can be chosen by the operator, for example, based on his/her observation of soil conditions and the like. The user interface 110 is preferably located on a front panel of the controller for ready access by the operator. The desired conveyor speed values (the set point values) and the actual speed values are preferably displayed on a set point and actual indicator 120 for the operator's direct observation.

The controller 100 can include any appropriate controller known to those in the art and can include a single controller or a plurality of controllers. Most preferably, however, a PID (proportional, integrating, differential)/fuzzy logic controller is used because such a controller is practical and cost effective. The control signals can be digital, analog, or any combination of the two as required. As noted, the controller 100 is preferably positioned for direct access by the harvester operator.

The drive mechanism 150 for the primary, secondary and/or de-viner conveyors preferably includes one or more hydraulic motors. The hydraulic motors are preferably controlled via electrically operated hydraulic valves, preferably proportional flow valves. Alternatively, the valves can be mechanically controlled proportional valves. Alternatively, a pressure balancing type of system can be used. Although less preferred, DC motor drives and variable frequency AC motor drives can also be used. The drive mechanism 150 can also include an automatic transmission that selects a speed closest the set point speed. Alternatively, although less preferred, a pneumatic drive could also be used. Moreover, a manual transmission could also be used, such as where an operator sets the speed based on an indicator such as an indicator light controlled by the controller (discussed below).

In the preferred embodiment, a forward speed measurement unit 160 is also provided that sends a signal to the controller 100 indicative of the forward speed (with respect to the ground) of the harvester. The measurement unit 160 preferably calculates the forward speed continually (e.g., continuously or at short intervals) and continually (e.g., continuously or at short intervals) sends forward speed signals to the controller 100.

As indicated above, the measurement accuracy of the harvester's actual forward speed with respect to the ground is very important for optimal performance. The means for sensing the forward speed of the harvester preferably includes a radar speed detector, such as a radar on a tractor driving the harvester or on the harvester itself. (As is known in the art, the harvester can be self propelled or can include a tractor for driving the harvester.) Alternatively, although less preferred, a global positioning system ("G.P.S.") or another positioning system could be used for monitoring speed. Alternatively, a measuring device having a ground tracking idler wheel could also be used. Other known speed measurement devices could also be used.

Due to ground conditions in ground-crop harvesting, measuring forward speed by wheel rotation or the like can lead to substantial inaccuracies in measurement (e.g., inaccuracies can occur due to wheel slippage). In less preferred embodiments, however, the speed could be determined by monitoring a) the wheel speed of the harvester or of a tractor driving the harvester (either a drive-wheel or a driven wheel), b) a speedometer of the harvester or of a tractor driving the harvester, or c) a power supply thereof.

Preferably, the drive mechanism 150 is controlled via a feedback loop to maintain and verify speed. In this regard, a conveyor speed measurer 170 is preferably also provided that measures the traveling speed of the primary, secondary and/or de-viner conveyors. Although such a feedback loop is preferred, a feedback loop and a conveyor speed measurer is not required in all embodiments and control can be conducted without feedback. When such a feedback loop is included, a variety of speed measuring devices can be used. Most preferably, a proximity switch is used that sends electric pulses while teeth, gears or cross-bars of the conveyor (i.e., on the conveyor belt or chain itself or on drive pulleys thereof) pass by the proximity switch. This latter type of speed measurement device is preferred because, among other things, it is very practical and reliable. Alternatively, the conveyor speed could be measured via a radar directed towards the conveyor. Alternatively, when a hydraulic drive is used, the conveyor speed could be measured by monitoring the volume flow rate of fluid to the hydraulic motor. Alternatively, the speed of an idler wheel mounted to the conveyor could be monitored. In another preferred alternative, a rotary encoder connected to a drive pulley could be utilized (either an incremental encoder or an absolute encoder). Other known means for measuring conveyor speeds could also be used.

The system preferably also includes a user interface 110 for inputting desired conveyor speed to forward speed ratios—and preferably also for inputting desired heights (as discussed with respect to the second control feature below). Preferably, the interface 110 is located on a front panel of the controller 100. Preferably, the interface 110 includes a control panel 111, FIG. 3(A), having control keys or buttons 112. The control keys 112 preferably include continuous increase and decrease keys 113 and 114. Alternatively, the user interface 110 can include a numerical key pad (not shown) for numerical entry of desired ratio and/or desired height values. Alternatively, an analog selection means can be used, such as a potentiometer or the like device (e.g., having a knob, slide, lever or the like such as member 115 in FIG. 3(B)). The user interface 110 can include an electrical interface, a mechanical interface or both.

Alternatively, the desired ratio values (and the height values discussed below) can be automatically determined. The determined values could also be automatically input into the system, rather than being manually input into the system. For example, a yield monitor 180 could be provided to detect an amount of product yield (e.g., yield of potatoes) at a location downstream of the primary and secondary conveyors (e.g., product yield could be calculated after discharge from the boom 50). This yield value could be used to specify conveyor speed ratios and to optimize product height. In addition, means could be included to monitor (1) the soil content (e.g., moisture level, texture, type, etc.) and/or to monitor (2) the soil separation along the primary conveyor (e.g., locations, rates, etc.) and to automatically select and input and/or suggest to an operator a preferred conveyor speed to ground speed ratio based thereon.

The set point and actual indicators 120 are preferably integral with the controller 100, and with the user interface 110. Alternatively, separate indicators can be provided. Preferably, a first indicator 116 displays the set point value and a second indicator 117 displays the actual operating condition. Alternatively, a single indicator (not shown) can be used to display the set point and actual values and, for example, a toggle switch can be used to alternate the display between the set point and the operating point. The indicators can be digital and/or analog and can be mechanical and/or electrical in nature. Preferably, the actual operating point continues to be indicated during the manual mode (discussed below) for the operator's reference. Although less preferred, one or more of the indicators could be omitted.

The system also preferably includes a manual speed controller 130 (including, for example, a potentiometer) so that the operator can, if desired, manually control the conveyor speeds. The manual speed controller 130 can have analog or digital control. Preferably, control is performed by varying the voltage to a hydraulic valve of a hydraulic motor (i.e., when the drive mechanism 150 is a hydraulic motor). Alternatively, the position of a hydraulic valve could be mechanically changed. Alternatively, the operator could manually operate a gear-shift mechanism to vary the speed of the conveyor.

In one embodiment, when in the manual mode, the controller 100 can be used to control an indicator (not shown, such as an indicator light on the user interface 110, a high/low alarm, etc.) to provide the operator with an indication of whether to speed up or to slow down a separating conveyor (or the vehicle itself) to maintain a proper ratio of the conveyor speed. In this embodiment, the controller operates in a similar manner, but does not itself automatically change the conveyor speed, but rather provides an indication for the operator to change the speed. In other embodiments, no indicator is used in the manual mode.

A switch 140 is preferably provided for alternating between an automatic mode under the controller 100 and a manual mode under the controller 130. The switch 140 connects either the controller 100 or the controller 130 to the drive mechanism 150 that drives the primary and/or secondary conveyors. The controller 130 preferably automatically sets the drive mechanism to a preset speed when switched to the manual mode.

The switch 140 is preferably an electro-mechanical switch or a digital solid state switch. Accordingly, the switch 140 can be manually controlled (such as by a push button) or can be electronically controlled (e.g., via the controller 100). Alternatively, although less preferred, the switch can be a mechanical switch, e.g., a push button or a toggle switch.

In the operation of the preferred embodiment, the operator can select ratios of the separating conveyor speeds to the forward speed based on conditions such as soil wetness, soil type (e.g., clay, sand, gravel, etc.), soil texture, and the like. An operator can thus readily adjust the harvester for optimal performance even if conditions change within the same field. For example, if sections of the field have soil conditions requiring different ratios, the operator can quickly select the appropriate ratios as needed without stopping the operation of the harvester. Thus, without any delay in the operation of the harvester, the operator can set the harvester conveyors to operate at the needed ratios. Accordingly, the operator does not have to delay the operation of the harvester by changing gears, chains or other elements to set speeds, but can easily continue operation and thus increase productivity.

As one example, the primary conveyor could initially be set to a speed about 20% greater than the forward speed, and if the soil conditions change, e.g., if wetness increases, the operator can select a higher ratio to further spread out the soil on the conveyor to facilitate separation (such as, for example, about 50% faster than the forward speed).

The primary conveyor can typically be driven at a speed in a range of between, for example only, about 0% to 80% greater than the forward speed of the harvester. The noted ratios are exemplary only and the ratios can be varied depending on circumstances. Typically, the harvester is driven at a forward speed in a range of, for example only, between about 1½ and 4 miles/hour.

A large percent of the soil typically falls through the primary conveyor prior to reaching the secondary conveyor. Because the volume is thus reduced, the speed of the secondary conveyor is preferably set slower than the primary conveyor. The secondary conveyor can typically be in a range of, for example only, about 30% to 100% of the forward speed (i.e., typically less than the forward speed). Although the primary conveyor may possibly remove all of the soil, the secondary conveyor can also function to remove soil in a similar manner to the primary conveyor.

As noted, the first control feature is preferably applied at conveyors that separate soil, etc., from the ground-crop product ("separating conveyors"), while the second control feature, discussed below, is preferably applied at conveyors downstream therefrom ("downstream conveyors") that are used to convey the separated ground-crop. In the most preferred embodiments, as discussed, the first control feature is applied both to a primary conveyor and to a secondary conveyor as shown. In addition, the first control feature is also preferably applied to a de-viner conveyor as discussed. In less preferred embodiments, however, the secondary conveyor may be eliminated and the primary conveyor may alone convey the product and separate soil therefrom. In the latter example, the primary conveyor could extend to a rear-cross conveyor, or to another downstream conveyor. Similarly, in other less preferred embodiments, the de-viner conveyor can be eliminated. In still other less preferred embodiments, separating conveyors in addition to the primary and secondary conveyors can be included that are similarly controlled—e.g., three or more soil separating conveys can be provided.

According to the first control feature of the invention, the soil and ground-crop load can be consistently delivered onto and gently handled by the separating conveyors. This first control feature can thus vary conveyor speeds in accordance with loads that are gathered upon the separating conveyors, maintaining a consistent load independent of variations in the forward speed. In alternative although less preferred embodiments, the separating conveyors could be controlled by measuring the load or weight of the product (soil and ground-crop) on the respective conveyors, e.g., monitoring torque on conveyor drives due to product thereon or the like, to maintain a more consistent load independent of variations in the forward speed. Varying conveyor speeds based on load or weight measurements, however, can result in problems during starting and stopping. In addition, rough terrain and other factors can influence accuracy when load or weight measurements are used.

Downstream Conveyor Control

A second preferred feature is a system for maintaining the amount of product (e.g., potatoes) on conveyors downstream of the separating conveyors at a sufficient level. As discussed above, a ground-crop harvester having a combination of both the first and second control features is highly preferred.

The second control feature involves controlling the level of the product on the downstream conveyors to maintain a sufficient product level thereon. In short, the speed of the downstream conveyors is controlled to maintain a "full capacity" on the conveyors—i.e., having a full load covering the conveyor surfaces. This substantially reduces the risk of bruising. To maintain a sufficient product depth, the speed of a conveyor is continually adjusted to match the rate of product being handled. In one preferred example, with potatoes, the potatoes preferably cover substantially the entire conveyor surfaces so that potatoes are all in close proximity to one another and prevent relative movement of adjacent potatoes. The potatoes are preferably piled on the conveyor surface to a height of at least about 2 to 3 inches, and more preferably to about 6 to 8 inches, and can also be piled to a substantially greater height. In this manner, the potatoes protect one another during conveyance and bruising and the like is substantially reduced.

In the preferred embodiments, a sensing means is provided that "senses" the height of the ground-crop (e.g., potatoes) at preferably either a discharge of a device feeding to a particular conveyor or at a position near where the product is placed onto the particular conveyor. This signal is received by a controller and is fed back to an adjustable speed drive (preferably a continuously-variable variable speed drive) of the conveyor to adjust the speed of the conveyor so as to maintain the height over the conveyor at a particular set point value. Preferably, the user selects the set point value of the height to be maintained.

In one preferred embodiment, the product height is sensed at a point near the beginning of the side elevator 50 and the remaining downstream conveyors are adjusted based on that reading (i.e., the conveyor of the boom 60, etc.). Preferably, the speed of the rear-cross conveyor 40 is controlled to be a fixed ratio of the secondary conveyor 30. Alternatively, the speed of the rear-cross conveyor 40 can be controlled in accordance with a height value, but this is less preferred because the rear-cross conveyor is not as responsive to sudden increases in loading; the height can only be practically measured at the discharge of the rear-cross conveyor.

In another preferred construction, the speed of the conveyors in the harvester after the primary and secondary conveyors are calculated based on the flow rate off of the rear-cross conveyor (i.e., a height at the downstream end of the rear-cross conveyor). The speed and height of the product on the rear-cross conveyor 40 prior to discharge onto the side elevator 50 can be measured, and the speed of the conveyors downstream therefrom can be controlled based on the volumetric flow rate. Specifically, the following equation could be used to calibrate instantaneous speed of the other conveyors:

rear-cross speed×rear-cross depth×user selectable ratio=instantaneous speed of other conveyor(s)    EQ. 1

In this manner, the load on each conveyor downstream can be "anticipated" rather than merely being "reacted" to. When the desired speeds of one or more downstream conveyors are "anticipated" in this manner, the downstream conveyor speeds can either be instantaneously changed or a delay or time-lag can be included, if desired, before changing the downstream conveyor speed. In the most preferred embodiments, where the conveyors are powered by a proportional hydraulic system, tracking of the conveyors would function well with this method.

In some instances, however, it is still preferable to "react" to the height on a particular conveyor in order to control that height on that conveyor. When the height is low, the conveyor speed can be reduced, and when the height is high, the conveyor speed can be increased. (In this case, it is preferable to measure the height closer to the input end of the conveyor, rather than to the output end.) This can be simpler than a system that "anticipates" as discussed above. For example, it is not necessary to anticipate what height will result from certain conveyor speeds, and conveyor speed measurements and feed back requirements can be reduced.

Figure 4:
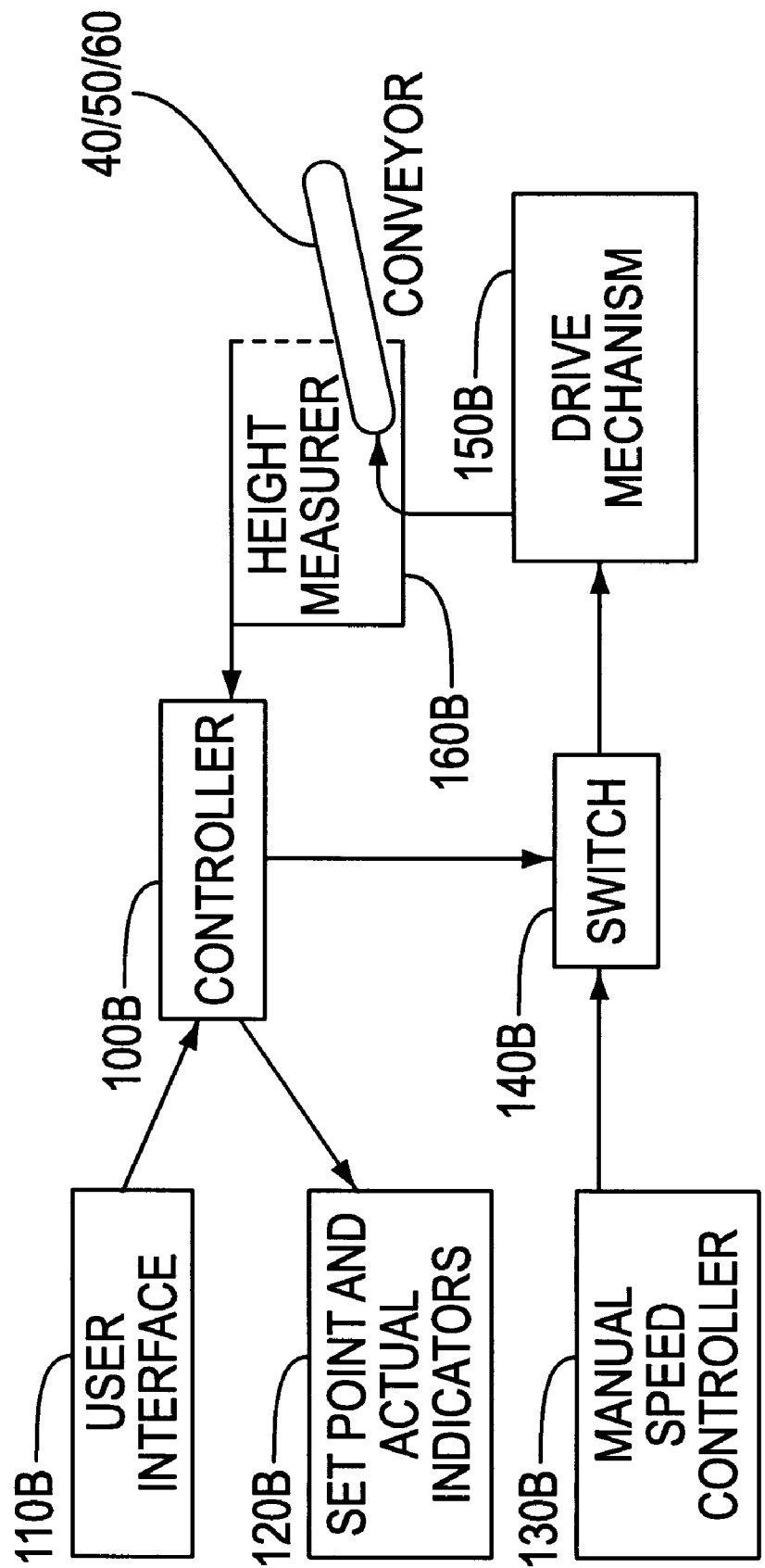
FIG. 4 is a diagram of a system according to one embodiment of a second control feature of the invention.

FIG. 4 is a diagram illustrating a preferred embodiment of the system for controlling the downstream conveyors (e.g., the conveyors downstream of the primary conveyor and/or the secondary conveyor). A central controller 100B (which is preferably like the controller 100) is used to control the speed of the rear-cross conveyor 40, the elevating conveyor 50, and/or the boom conveyor 60 (see numeral 40/50/60) via the drive mechanism 150B (which is preferably like the drive mechanism 150). A user inputs desired height values into an interface 110B (which is preferably like the interface 110). Preferably, a set point value (a desired speed) and actual speed values are displayed on a set point and actual indicator 120B (which is preferably like the indicator 120). In addition, a height measurement means 160B measures the height of the product and sends a signal indicative thereof to the controller 110B in order to adjust the speed of the conveyor. Moreover, a manual speed controller 130B (which is preferably like the controller 130) and a switch 140B (which is preferably like the switch 140) can be also included.

When both the first and second control features are combined on a harvester, as is preferred, elements of the first and second control features can be incorporated together. As some examples, the controller 100B can be the same as the controller 100 and the interface 110B can be the same as the interface 110.

The height measurement unit 160B can be formed in a variety of ways, and any known height measuring means can be used. One preferred embodiment is shown schematically in FIG. 5(A), wherein the height of the product conveyed is measured via one or more ultrasonic distance sensors (e.g., a single sensor 200 or an array of sensors can be provided thereover). Alternatively, although more costly, one or more laser distance measuring sensors could be used.

Figure 5H:
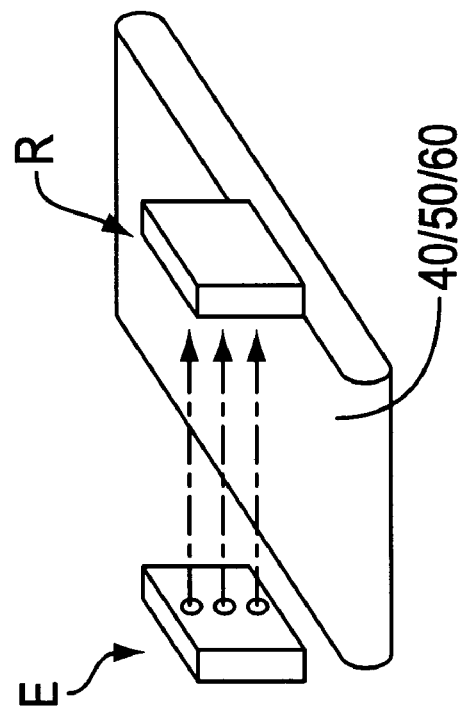
FIG. 5(H) is a schematic top view of a sixth embodiment of a height sensor used in the second control aspect of the invention.

Alternatively, as shown in FIG. 5(H), one or more sensors (e.g., one or more light emitters E and receivers R) can be arranged along the side of the conveyor for accurately reading a height thereon. An array of sensors can be used to more accurately measure the height upon the conveyor.

FIG. 5(B) shows another embodiment wherein a mechanical sensor 210 includes a wheel 211 that rolls on top of the product on the conveyor 40/50/60. The wheel 211 is mounted at the end of an arm 212, and the arm 212 is pivotally mounted upon the main pivot P. The angular position of the arm 212 is monitored via a rotary encoder (not shown). The rotary encoder is preferably an absolute encoder. Although less preferred, an incremental encoder can also be used. A rotary or linear potentiometer, digital or analog, could also be used to determine position. An LVDT (linear variable displacement transducer) could also be used to determine position. In an alternative embodiment shown in FIG. 5(C), the wheel 211 can be replaced with a slide member 211' that slides thereover. Although FIGS. 5(B) and 5(C) illustrate a single wheel 211 and a single slide member 211', one or more such wheels and/or slide members can be included. The wheels and/or slide members can have widths, in various embodiments, from about 1 inch wide to the full width of the conveyor.

In addition, a non-mechanical sensor (e.g., an ultrasonic sensor, etc.) can be used in combination with a mechanical sensor. For example, in the embodiments shown in FIGS. 5(A)–5(C), the wheel or slide member can function as a target for the non-mechanical sensor.

As shown in FIG. 5(D), the wheel 211 can be a roller that extends across the width of the conveyor and that moves vertically while remaining parallel to the surface of the conveyor. The wheel 211 preferably includes a softened outer surface such as foam or rubber to avoid bruising the ground-crop (e.g., potatoes). This embodiment thus measures a peak height above the conveyor.

FIGS. 5(E)–5(F) show another embodiment having two rollers 211" along a shaft that is pivotally mounted on an arm 212" at a pivot 213". The shaft supporting the rollers 211" is mounted to rotate around the axis of the arm 212". The two rollers 211" thus rotate about the pivot 213", and the pivot 213" is moved along with the arm 212" about the main pivot P. In this manner, the arm 212" measures an average height of the rollers 211".

Figure 5G:
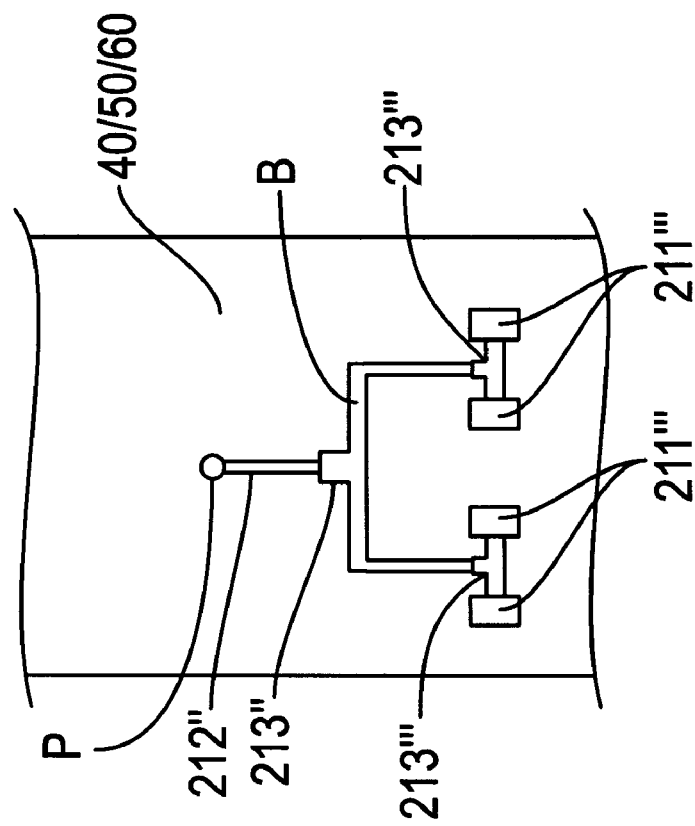
FIG. 5(G) is a schematic top view of a fifth embodiment of a height sensor used in the second control aspect of the invention.

Similarly, in the embodiment shown in FIG. 5(G), four rollers 211''' are provided. One pair of rollers is mounted on a first shaft that is pivotally mounted on a pivot 213''', and another pair of rollers is mounted on a second shaft that is pivotally mounted on a pivot 213'''. The pivots 213''' are mounted on a generally U-shape bracket B that is pivotally mounted on the pivot 213" so as to rotate only around the axis of the arm 212". In this manner, the arm 212" is raised to an average height of the four rollers 211'''.

Alternatively, although much less preferred, the pile height can be estimated, and conveyor speeds can be adjusted accordingly, by monitoring the load on the conveyor—e.g., such as by monitoring torque on conveyor drives. However, this can result in problems during starting and stopping. In addition, rough terrain and other factors can influence accuracy when load measurements are used. Because conditions can vary (e.g., product can have different sizes, densities, etc.) and because maintaining a proper height is important to preventing product damage, measuring height indirectly by load is less preferred.

Preferably, the harvester includes the first control aspect in conjunction with the separating conveyors and the second control aspect in conjunction with conveyors downstream therefrom. This creates a harvester that greatly outperforms other harvesters in both capacity and product quality.

In addition to other benefits discussed herein-above, maintaining a uniform ground-crop height on the conveyors can also dramatically improve the performance of separation systems that separate items carried along the conveyors—such as "air heads" used to separate rocks and the like and "air knives" used to remove light debris.

According to one preferred method of carrying out the present invention, existing harvesters are upgraded to include the aspects of the present invention. In this regard, for example, if an existing harvester has a mechanical conveyor drive, it can be modified to include hydraulic drives (in the preferred construction), speed sensors, controllers, etc., and if an existing harvester is already equipped with independent adjustable speed drives, speed sensors, controllers, etc., can be added.

While the present invention has been shown and described with reference to preferred embodiments presently contemplated as best modes for carrying out the invention, various changes may be made in adapting the invention to different embodiments without departing from the broader inventive concepts disclosed herein and comprehended by the claims which follow. For example, although a preferred harvester structure has been schematically illustrated, the two control features of the present invention can be applied in any known ground-crop harvester. The ground-crop harvester preferably has 1) excavating means for digging soil and potatoes (e.g., a blade or the like), 2) initial conveyors for separating soil from the ground-crop, and 3) one or more downstream conveyors for handling the separated ground-crop, but the illustrated harvester arrangement is just one preferred example. As other examples, one or more features of the present invention can be applied in harvesters having structure like that shown in U.S. Pat. Nos. 3,889,796, 4,842,076, and 5,077,963, the entire disclosures of which are incorporated herein by reference. As discussed, one or more aspects of the present invention can be applied in any appropriate harvester. The illustrated separating conveyors (e.g., the primary and secondary conveyors) and/or the illustrated downstream conveyors (i.e., the rear-cross conveyor, the elevating conveyor and the boom conveyor) are not required in all embodiments, and the present invention can be applied to various other known harvesters having differing conveyor arrangements.

What is claimed is:

1. A ground-crop harvester, comprising:
   a) an excavating means arranged to scrape up a layer of soil and ground-crop;
   b) a primary conveyor configured to receive the soil and ground-crop scraped up by said excavating means and to separate soil from said ground-crop;
   c) a downstream conveyor arranged to receive the separated ground-crop from said primary conveyor;
   d) a primary conveyor adjustable speed drive mechanism that drives the primary conveyor;
   e) a downstream conveyor adjustable speed drive mechanism that drives the downstream conveyor;
   f) a harvester drive that drives the harvester;
   g) speed sensing means for sensing the forward speed of the harvester and for emitting signals representative of said speed;
   h) amount sensing means for sensing an amount of product conveyed by said downstream conveyor and for emitting signals representative of said amount;
   i) a controller that controls said primary conveyor adjustable speed drive mechanism to vary the speed of said primary conveyor based on said signals from said speed sensing means and that controls said downstream conveyor adjustable speed drive mechanism to vary the speed of said downstream conveyor based on said signals from said amount sensing means.

2. The ground-crop harvester of claim 1, further including a secondary conveyor that receives product from said primary conveyor and conveys the product toward said downstream conveyor, wherein said controller also controls a secondary conveyor adjustable speed drive mechanism to vary the speed of said secondary conveyor based on signals from said speed sensing means.

3. The ground-crop harvester of claim 2, further including a large debris conveyor that receives large debris from said primary conveyor and removes said large debris from the harvester, wherein said controller controls said large debris conveyor to vary in accordance with the speed of said secondary conveyor.

4. The ground-crop harvester of claim 3, wherein said large debris conveyor is a de-viner conveyor that surrounds said secondary conveyor.

5. The ground-crop harvester of claim 1, further including at least one additional downstream conveyor, wherein said controller also controls adjustable speed drive mechanisms of at least one of said at least one additional downstream conveyor to vary the speed of said at least one of said at least one additional downstream conveyor based on signals from said amount sensing means.

6. A ground-crop harvester, comprising:
   a) an excavating means arranged to scrape up a layer of soil and ground-crop;
   b) a primary conveyor configured to receive the soil and ground-crop scraped up by said excavating means;
   c) an adjustable speed drive mechanism that drives the primary conveyor;
   d) a harvester drive that drives the harvester;
   e) means for sensing the forward speed of the harvester and for emitting signals representative of said speed;
   f) a controller that controls said drive mechanism that drives the primary conveyor based on said signals from said means for sensing the forward speed.

7. A ground-crop harvester, comprising:
   a) an excavating means arranged to scrape up a layer of soil and ground-crop;
   b) a primary conveyor configured to receive the soil and ground-crop scraped up by said excavating means;
   c) an adjustable speed drive mechanism that drives the primary conveyor at a conveyor speed;
   d) a harvester drive that drives the harvester at a forward speed; and
   e) a controller that automatically controls said adjustable speed drive mechanism to vary the conveyor speed as the forward speed of the harvester varies, whereby a consistent load is maintained on said primary conveyor as the forward speed of the harvester varies.

8. The ground-crop harvester of claim 7, further including means for sensing the forward speed of the harvester and for emitting signals representative of said speed, said controller controlling said drive mechanism that drives the primary conveyor based on said signals from said means for sensing the forward speed.

9. The ground-crop harvester of claim 7, further including a secondary conveyor downstream of said primary conveyor and an adjustable speed drive mechanism for said secondary conveyor, said controller also automatically controlling said drive mechanism for said secondary conveyor to vary a speed of said secondary conveyor so as to maintain a consistent load on said secondary conveyor irrespective of variations in the forward speed of the harvester.

10. The ground-crop harvester of claim 7, wherein said adjustable speed drive mechanism includes a hydraulic motor.

11. The ground-crop harvester of claim 8, wherein said means for sensing the forward speed of the harvester senses forward speed irrespective of wheel slippage.

12. The ground-crop harvester of claim 8, wherein said means for sensing the forward speed of the harvester includes a radar speed detector.

13. The ground-crop harvester of claim 8, wherein said controller controls said adjustable speed drive mechanism to maintain a speed that is a predetermined ratio of a forward speed detected by said means for sensing forward speed of the harvester.

14. The ground-crop harvester of claim 13, further including a user interface for inputting said predetermined ratio.

15. The ground-crop harvester of claim 8, further including a means for sensing the actual speed of said primary conveyor and for sending signals representative thereof to said controller.

16. The ground-crop harvester of claim 15, wherein said controller includes a feedback loop to re-adjust conveyor speed signals sent to said adjustable speed drive mechanism based on said signals received from said means for sensing the actual speed of said primary conveyor.

17. The ground-crop harvester of claim 15, including at least one indicator for indicating the actual speed of said primary conveyor and a desired speed of said primary conveyor.

18. The ground-crop harvester of claim 7, wherein said ground-crop harvester is a potato harvester.

19. The ground-crop harvester of claim 7, wherein said harvester drive is on said harvester or on a tractor that drives said harvester.

20. A ground-crop harvester, comprising:
    a) an excavating means arranged to scrape up a layer of soil and ground-crop;
    b) a primary conveyor configured to receive the soil and ground-crop scraped up by said excavating means and to separate soil from said ground-crop;
    c) a downstream conveyor configured to receive the separated ground-crop from said primary conveyor;
    d) an adjustable speed drive mechanism that drives the primary conveyor;
    e) means for sensing an amount of product conveyed by said downstream conveyor and for emitting signals representative of said amount;
    f) an adjustable speed drive mechanism that drives said downstream conveyor;
    g) control means for adjusting the speed of said downstream conveyor via said adjustable speed drive mechanism for said downstream conveyor based on said signals from said means for sensing an amount of product conveyed by said downstream conveyor.

21. The ground-crop harvester of claim 20, wherein said means for sensing an amount of product conveyed by said downstream conveyor includes a means for sensing the height of the product received on said downstream conveyor.

22. The ground-crop harvester of claim 21, wherein said means for sensing the height of the product received on said downstream conveyor senses the height at a location prior to delivery to said downstream conveyor.

23. The ground-crop harvester of claim 21, wherein said means for sensing the height of the product received on said downstream conveyor senses the height at a location on said downstream conveyor proximate the beginning of said downstream conveyor.

24. A method of gathering and handling ground-crops and consistently separating soil gathered with the ground-crops, comprising the steps of:
    a) scraping up a layer of soil and ground-crop with an excavating means;
    b) receiving the layer of soil and ground-crop scraped up by said excavating means on a primary conveyor, said primary conveyor separating said soil from said ground-crop;
    c) driving the primary conveyor with an adjustable speed drive mechanism;
    d) driving the harvester with a harvester drive;
    e) sensing the forward speed of the harvester and emitting signals representative of said speed;
    f) automatically controlling with a controller said drive mechanism that drives the primary conveyor based on said signals from said means for sensing the forward speed.

25. A method of gathering and handling ground-crops and consistently separating soil gathered with the ground-crops, comprising the steps of:
    a) scraping up a layer of soil and ground-crop with an excavating means;
    b) receiving the layer of soil and ground-crop scraped up by said excavating means on a primary conveyor, said primary conveyor separating said soil from said ground-crop;
    c) driving the primary conveyor at a conveyor speed with an adjustable speed drive mechanism;
    d) driving the harvester at a forward speed with a harvester drive; and
    e) automatically controlling said drive mechanism with a controller to vary the conveyor speed as the forward speed of the harvester varies, whereby a consistent load is maintained on said primary conveyor as the forward speed of the harvester varies.

* * * * *